(12) United States Patent
Ichimura et al.

(10) Patent No.: US 12,217,452 B2
(45) Date of Patent: Feb. 4, 2025

(54) POSITION ANALYSIS DEVICE AND METHOD, AND CAMERA SYSTEM

(71) Applicant: Panasonic Intellectual Property Management Co., Ltd., Osaka (JP)

(72) Inventors: Daijiroh Ichimura, Hyogo (JP); Hidehiko Shin, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 327 days.

(21) Appl. No.: 17/941,172

(22) Filed: Sep. 9, 2022

(65) Prior Publication Data

US 2023/0005175 A1 Jan. 5, 2023

Related U.S. Application Data

(63) Continuation of application No. PCT/JP2020/042644, filed on Nov. 16, 2020.

(30) Foreign Application Priority Data

Mar. 27, 2020 (JP) ................................ 2020-058401

(51) Int. Cl.
 *G06T 7/00* (2017.01)
 *G06T 7/70* (2017.01)
 *H04N 23/80* (2023.01)

(52) U.S. Cl.
 CPC .............. *G06T 7/70* (2017.01); *H04N 23/80* (2023.01); *G06T 2207/20081* (2013.01)

(58) Field of Classification Search
 CPC .......... G06K 9/00261; G06K 9/00288; G06K 9/00228; G06K 9/00268; G06K 9/00281;
(Continued)

(56) References Cited

U.S. PATENT DOCUMENTS 10,694,148 B1 * 6/2020 Li ...................... G01C 21/1656
2017/0322048 A1 * 11/2017 Yoshida .................. G01C 3/08

FOREIGN PATENT DOCUMENTS

JP      2003-78811           3/2003
WO   WO-2019073772 A1 *  4/2019  ............... G05D 1/02

OTHER PUBLICATIONS

International Search Report issued Jan. 26, 2021 in International (PCT) Application No. PCT/JP2020/042644.
(Continued)

*Primary Examiner* — Quan M Hua
(74) *Attorney, Agent, or Firm* — Wenderoth, Lind & Ponack, L.L.P.

(57) ABSTRACT

A position analysis device includes: an input interface that acquires the captured image obtained by the camera; a processor that calculates coordinate transformation from a first coordinate system to a second coordinate system with respect to the target position in the acquired captured image; and a memory that stores a correction model to generate a correction amount of a position in the second coordinate system, wherein the processor corrects a transformed position from the target position, based on the correction model including weight functions corresponding to reference positions, the transformed position being a position obtained by the coordinate transformation on the target position in the first coordinate system to the second coordinate system, the weight functions each producing a larger weighting in the correction amount as the transformed position is closer to a corresponding reference position, the reference positions being different from each other in the second coordinate system.

11 Claims, 8 Drawing Sheets

(58) Field of Classification Search
CPC ......... G06K 9/6202; G06K 2009/4666; G06K 9/00362; G06K 9/4642; G06K 9/6206; G06K 9/6255; G06K 9/6256; G06K 9/00275; G06K 9/00308; G06K 9/00926; G06K 9/3233; G06K 9/4671; G06K 9/6215; G06K 9/6228; G06K 9/6262; G06K 9/627; G06K 9/6276; G06K 9/629; G06N 3/0454; G06N 3/084; G06N 3/08; G06T 11/00; G06T 2207/10016; G06T 2207/10024; G06T 2207/20081; G06T 2207/30201; G06T 2207/30241; G06T 2207/30244; G06T 7/251; G06T 7/74; G06T 7/80

See application file for complete search history.

(56) References Cited

OTHER PUBLICATIONS

International Preliminary Report on Patentability issued Sep. 22, 2022 in International (PCT) Application No. PCT/JP2020/042644.

\* cited by examiner

POSITION ANALYSIS DEVICE AND METHOD, AND CAMERA SYSTEM

BACKGROUND

1. Technical Field

The present disclosure relates to a position analysis device and method, and a camera system.

2. Related Art

JP 2003-78811 A discloses a method of associating marker coordinates in a calibration pattern with respect to acquisition of camera parameters. In this method, a quadrangular calibration pattern having a plurality of marker patterns is photographed, a calibration pattern region is extracted from the photographed image, and image coordinates of four corners of the calibration pattern region are obtained. Further, in this method, the projective transformation matrix is obtained from the image coordinates of the corners of the calibration pattern region and coordinates of corners in a planar image of an original calibration pattern. The camera parameter is obtained by obtaining the correspondence between the coordinates of the marker in the original calibration pattern planar image and the coordinates of the marker in the photographed image using the projective transformation matrix.

SUMMARY

The present disclosure provides a position analysis device and method, and a camera system capable of accurately measuring a position as a target of an analysis in a subject from a captured image by a camera.

A position analysis device in the present disclosure is a device for measuring a target position in a subject, based on a captured image of the subject by a camera. The position analysis device includes an input interface, a processor, and a memory. The input interface acquires the captured image obtained by the camera. The processor calculates coordinate transformation from a first coordinate system to a second coordinate system with respect to the target position in the acquired captured image, the first coordinate system providing measure in the captured image, the second coordinate system providing measure in the subject. The memory stores a correction model to generate a correction amount of a position in the second coordinate system. The processor corrects a transformed position from the target position, based on the correction model, the transformed position being a position obtained by the coordinate transformation on the target position in the first coordinate system to the second coordinate system, the weight functions each producing a larger weighting in the correction amount as the transformed position is closer to a corresponding reference position, the reference positions being different from each other in the second coordinate system.

These general and specific aspects may be realized by a system, a method, and a computer program, and a combination thereof.

According to the position analysis device and method, and the camera system of the present disclosure, it is possible to accurately measure the target position in the subject from the captured image by the camera.

DESCRIPTION OF EMBODIMENTS

Embodiments will be described in detail below with reference to the drawings as appropriate. However, more detailed description than necessary may be omitted. Fox example, detailed description of already well-known matters and redundant description of substantially the same configuration may be omitted. This is to avoid the following description from becoming unnecessary redundant and to facilitate understanding by those skilled in the art.

In addition, the applicant(s) provides the accompanying drawings and the following description to enable those skilled in the art to sufficiently understand the present disclosure, which does not intend to limit the claimed subject matter.

First Embodiment

Hereinafter, a first embodiment of the present disclosure will be described with reference to the drawings.

1. Configuration

A configuration of a position analysis device and a camera system according to the present embodiment will be described below.

1-1. Camera System

Figure 1:
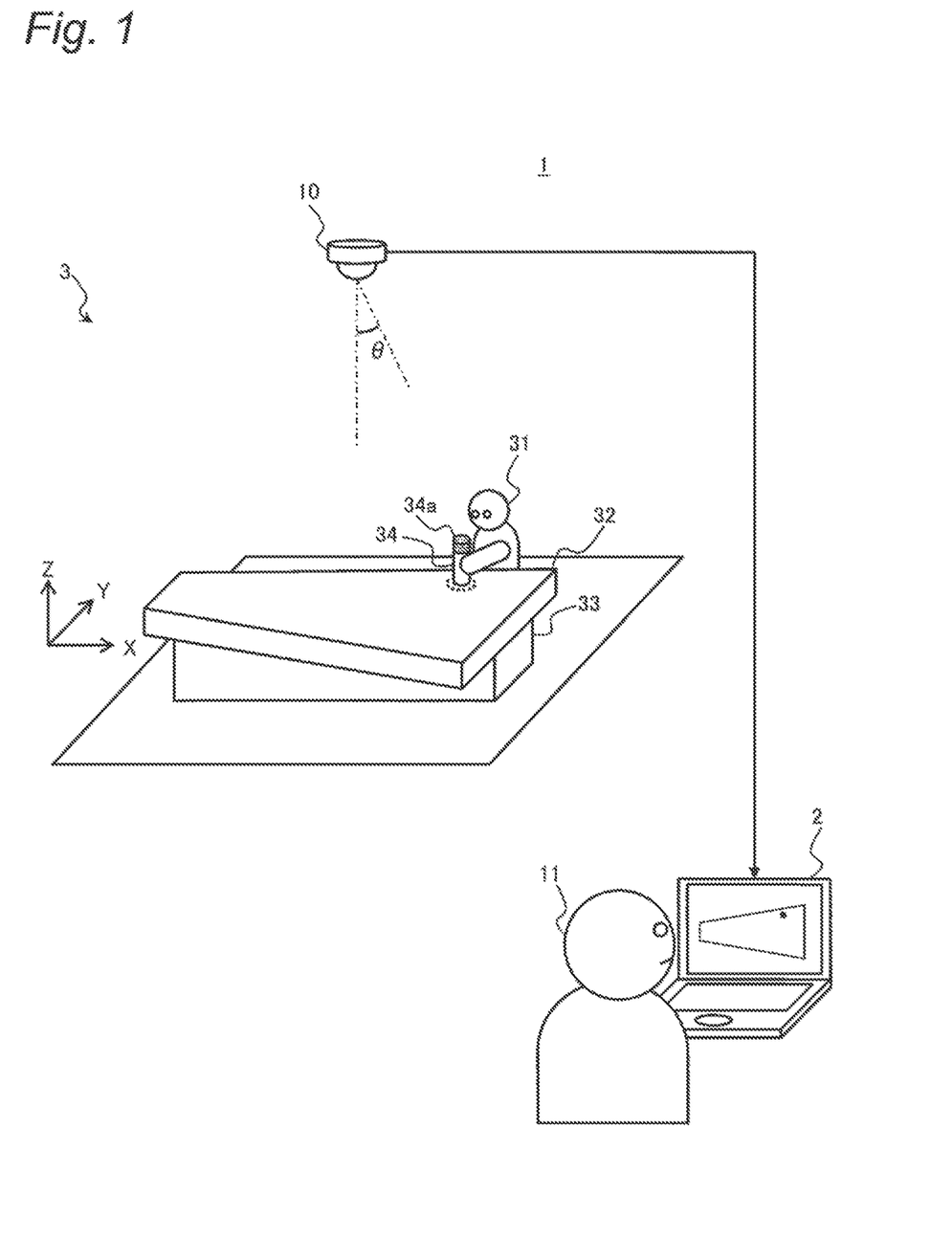
FIG. 1 is a diagram for explaining a camera system according to a first embodiment of the present disclosure.

FIG. 1 is a diagram for explaining a camera system 1 according to the present embodiment. As illustrated in FIG. 1, the camera system 1 of the present embodiment includes an omnidirectional camera 10 and a position analysis device 2, for example. The present system 1 can be applied to an application of providing various data, which is related to machining work or the like performed by a worker 31, to a user 11 such as a person in charge of data analysis in a workplace 3 such as a factory, for example.

Hereinafter, the vertical direction in the workplace 3 is referred to as a Z direction. Two directions perpendicular to each other on a horizontal plane orthogonal to the Z direction are referred to as an X direction and a Y direction, respectively. Further, the +Z direction may be referred to as upward, and the −Z direction may be referred to as downward.

In the example of FIG. 1, the omnidirectional camera 10 is arranged on a ceiling or the like of the workplace 3 so as to overlook the workplace 3 from above. In this example, in the workplace 3, a workpiece 32 is arranged on a pedestal 33. For example, the workpiece 32 is various members constituting a large product, e.g. a constituent member of a large blower, an automobile, a train, an aircraft, a ship, or the like. The workpiece 32 is an example of a subject in the present system 1.

The example of FIG. 1 illustrates a state in which the worker 31 performs surface machining on the workpiece 32 by using a surface machining tool 34 that is a tool for local surface machining. The surface machining tool 34 is provided with a marker 34a at the end portion, for example. By a position measurement method to the captured image from the omnidirectional camera 10, the position analysis device 2 of the present system 1 can accurately measure the position of the portion of the workpiece 32 subjected to the surface machining by the worker 31, for example. Hereinafter, the configuration of each device in the present system 1 will be described.

The omnidirectional camera 10 is an example of a camera in the present system 1. For example, the omnidirectional camera 10 includes an optical system such as a fisheye lens, and an imaging element such as a CCD or a CMOS image sensor. For example, the omnidirectional camera 10 performs art imaging operation according to the equidistant projection method, to generate image data indicating a captured image. The omnidirectional camera 10 is connected to the position analysis device 2 such that image data is transmitted to the position analysis device 2, for example.

In the example of FIG. 1, the omnidirectional camera 10 is arranged so that the workpiece 32 is included in a range to be imaged in the workplace 3. The omnidirectional camera 10 is arranged with its optical axis oriented in the Z direction, for example. For example, the half angle of view of the omnidirectional camera 10 is $\theta \leq 90°$ at an angle $\theta$ with respect to the Z direction. According to the omnidirectional camera 10, a relatively wide area can be imaged by one camera.

The position analysis device 2 includes an information processing device such as a personal computer (PC). The configuration of the position analysis device 2 will be described with reference to FIG. 2.

1-2. Configuration of Position Analysis Device

Figure 2:
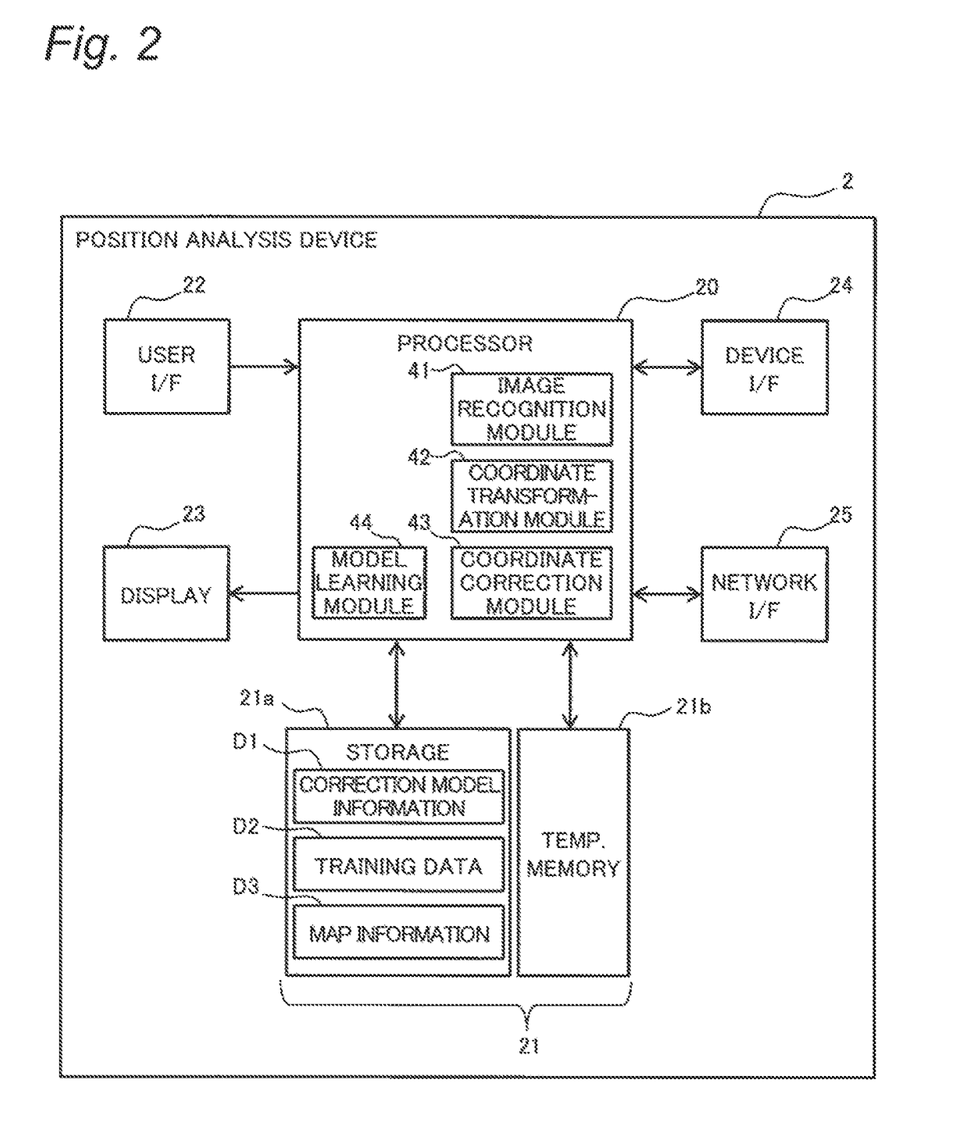
FIG. 2 is a block diagram illustrating a configuration of a position analysis device according to the first embodiment.

FIG. 2 is a block diagram illustrating a configuration of the position analysis device 2. The position analysis device 2 illustrated in FIG. 2 includes a processor 20, a memory 21, a user interface 22, a display 23, a device interface 24, and a network interface 25. Hereinafter, the interface may be abbreviated as "I/F".

The processor 20 includes a CPU or an MPU that realizes a predetermined function in cooperation with software, for example. The processor 20 controls the overall operation of the position analysis device 2, for example. The processor 20 reads data and programs stored in the memory 21 and performs various arithmetic processing to realize various functions. For example, the processor 20 includes an image recognition module 41, a coordinate transformation module 42, a coordinate correction module 43, and a model learner 44 as functional configurations.

The image recognition module 41 applies various image recognition technologies to the image data to recognize a position of a preset processing target in the image indicated by the image data. The coordinate transformation module 42 calculates coordinate transformation between predetermined coordinate systems with respect to the position recognized in the image. The coordinate correction module 43 executes processing of correcting a calculation result of the coordinate transformation module 42 based on a correction model to be described later. The model learner 44 executes machine learning of the correction model. The operation of such various functions of the position analysis device 2 will be described later.

The processor 20 executes a program including a command group for realizing the function of the position analysis device 2 as described above, for example. The above program may be provided from a communication network such as the internet, or may be stored in a portable recording medium. Furthermore, the processor 20 may be a hardware circuit such as a dedicated electronic circuit or a reconfigurable electronic circuit designed to realize each of the above-described functions. The processor 20 may be configured by various semiconductor integrated circuits such as a CPU, an MPU, a GPU, a GPGPU, a TPU, a microcomputer, a DSP, an FPGA, and an ASIC.

The memory 21 is a storage medium that stores programs and data necessary for realizing the functions of the position analysis device 2. As illustrated in FIG. 2, the memory 21 includes a storage 21a and a temporary memory 21b.

The storage 21a stores parameters, data, control programs, and the like for realizing a predetermined function. The storage 21a includes an HDD or an SSD, for example. For example, the storage 21a stores the above-described programs, correction model information D1, training data D2, map information D3, and the like.

The correction model information D1 includes various parameters such as a weight parameter indicating a learning result of the correction model. The correction model information D1 may include an arithmetic expression of the correction model. The training data D2 is data used as a ground truth in the machine learning of the correction model. The map information D3 indicates the arrangement of various objects such as the workpiece 32 and the pedestal 33 in the workplace 3 in a predetermined coordinate system, for example. Details of the various information will be described later.

For example, the temporary memory 21b includes a RAM such as a DRAM or an SRAM, to temporarily store (i.e., hold) data. For example, the temporary memory 21b holds image data and the like received from the omnidirectional camera 10. In addition, the temporary memory 21b may function as a work area of the processor 20, and may be configured as a storage area in an internal memory of the processor 20.

The user interface 22 is a general term for operation members operated by a user. The user interface 22 may constitute a touch panel together with the display 23. The user interface 22 is not limited to the touch panel, and may be e.g. a keyboard, a touch pad, a button, a switch, or the like. The user interface 22 is an example of an input interface that acquires various information input by a user operation.

The display 23 is an example of an output interface including a liquid crystal display or an organic EL display, for example. The display 23 may display various information such as various icons for operating the user interface 22 and information input from the user interface 22.

The device I/F 24 is a circuit for connecting an external device such as the omnidirectional camera 10 to the position analysis device 2. The device I/F 24 performs communication in accordance with a predetermined communication standard. The predetermined standard includes USB, HDMI (registered trademark), IEEE 1395, WiFi, Bluetooth, and the like. The device I/F 24 is an example of an input interface that receives image data and the like from the omnidirectional camera 10. The device I/F 24 may constitute an output interface that transmits various information to an external device in the position analysis device 2.

The network I/F 25 is a circuit for connecting the position analysis device 2 to a communication network via a wireless or wired communication line. The network I/F 25 performs communication conforming to a predetermined communication standard. The predetermined communication standard includes communication standards such as IEEE802.3 and IEEE802.11a/11b/11g/11ac. The network I/F 25 may constitute an input interface that receives or an output interface that transmits various information via a communication network in the position analysis device 2. For example, the network I/F 25 may be connected to the omnidirectional camera 10 via a communication network.

The configuration of the position analysis device 2 as described above is an example, and the configuration of the position analysis device 2 is not limited thereto. The position analysis device 2 may be configured by various computers including a server device. The position analysis method of the present embodiment may be executed in distributed computing. In addition, the input interface in the position analysis device 2 may be realized by cooperation with various software in the processor 20 and the like. The input interface in the position analysis device 2 may acquire various information by reading various information stored in various storage media (e.g., the storage 21*a*) to a work area (e.g., the temporary memory 21*b*) of the processor 20.

2. Operation

Operations of the camera system 1 and the position analysis device 2 configured as described above will be described below.

2-1. Basic Operation

A basic operation of the position analysis device 2 in the present system 1 will be described with reference to FIGS. 3 to 4C.

Figure 3:
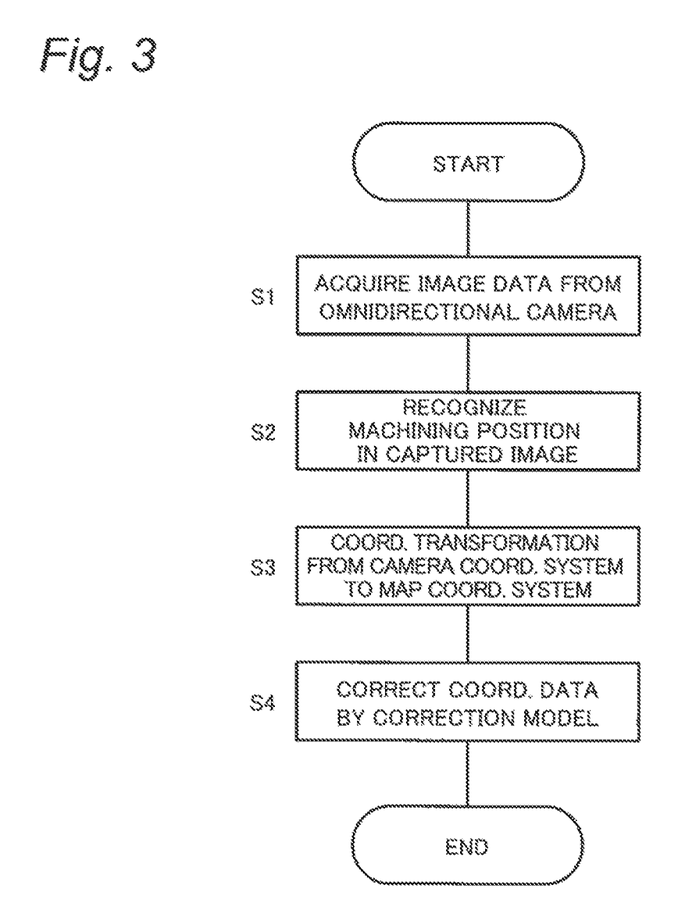
FIG. 3 is a flowchart for explaining a basic operation of the position analysis device.

FIG. 3 is a flowchart for explaining the basic operation of the position analysis device 2. FIGS. 4A to 4C are diagrams for explaining the basic operation of the position analysis device 2. Each processing illustrated in the flowchart of FIG. 3 is executed by the processor 20 functioning as the image recognition module 41, the coordinate transformation module 42, and the coordinate correction module 43.

At first, the processor 20 of the position analysis device 2 acquires image data from the omnidirectional camera 10 via the device I/F 24, for example (S1). For example, while the worker 31 is working in the workplace 3, the omnidirectional camera 10 repeats an imaging operation at a predetermined cycle, generates image data indicating a captured image, and transmits the image data to the position analysis device 2.

Figure 4A:
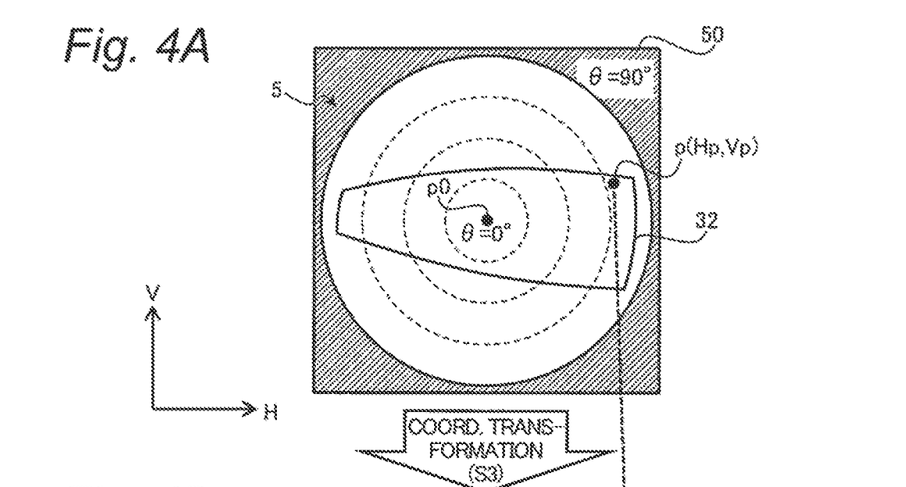
FIGS. 4A to 4C are diagrams for explaining the basic operation of the position analysis device.

FIG. 4A illustrates an example of image data 50 acquired in step S1. The image data 50 has a two-dimensional coordinate system (H, V) according to arrangement of pixels in a captured image 5, for example. Hereinafter, the coordinate system (H, V) of the captured image 5 by the omnidirectional camera 10 is referred to as a camera coordinate system. The camera coordinate system includes an H coordinate indicating the position of the captured image 5 in the horizontal direction and a V coordinate indicating the position of the captured image 5 in the vertical direction. The camera coordinate system is an example of a first coordinate system in the present embodiment.

FIG. 4A illustrates the workpiece 32 illustrated in the captured image 5. For convenience of description, illustration of the worker 31 and the like in the captured image 5 is omitted. In the captured image 5 of the omnidirectional camera 10, the scale changes such that the workpiece 32 is shrunk as the angle θ increases from the center position p0 at the angle θ=0°. If there is no lens distortion or the like in the omnidirectional camera 10, the change is isotropic from the center position p0 by the equidistant projection method and is at equal intervals at the angle θ.

Next, the processor 20, functioning as the image recognition module 41 based on the acquired image data 50, recognizes the machining position in the captured image 5 in the camera coordinate system (S2). The machining position is a position at which the machining work by the surface machining tool 34 is performed on the workpiece 32. The machining position is an example of the target position in the present embodiment. FIG. 4A illustrates a machining position p in the captured image 5.

For example, the processor 20 performs image recognition processing to recognize the machining position p by detecting the marker 34*a* provided on the surface machining tool 34 in the captured image 5 (S2). In step S2, as exemplified in FIG. 4A, the processor 20 extracts coordinates (Hp, Vp) of the machining position p in the camera coordinate system from the image data 50.

Next, the processor 20, functioning as the coordinate transformation module 42, calculates the coordinate transformation from the camera coordinate system to the map coordinate system, based on the recognition result in the captured image 5 (S3). The map coordinate system is a coordinate system for providing measure on a position in the workplace 3 based on the map information D3. FIG. 4B illustrates a processing example of step S3.

Figure 4B:
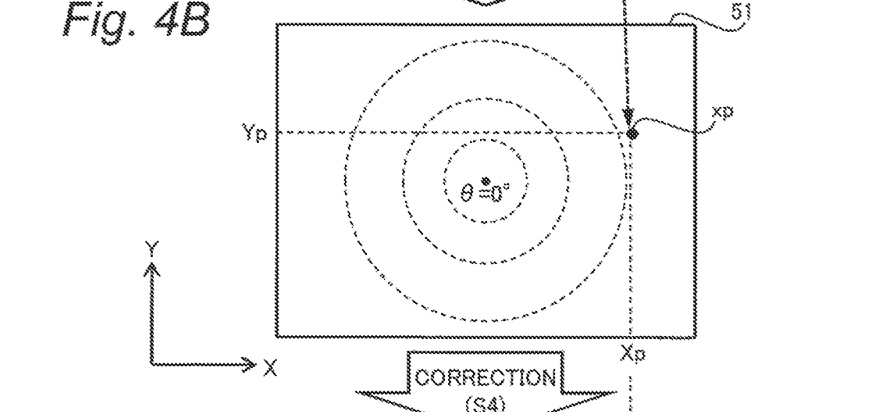

FIG. 4B illustrates coordinate data 51 indicating the processing result of step S3 based on the image data 50 of FIG. 4A. The coordinate data 51 indicates coordinates of a position in the map coordinate system. For example, the map coordinate system includes an X coordinate for indicating a position in the X direction of the workplace 3 and a Y coordinate for indicating a position in the Y direction. The map coordinate system is an example of a second coordinate system in the present embodiment.

The coordinate data 51 illustrated in FIG. 48 indicates coordinates (Xp, Yp) obtained by coordinate-transforming the coordinates (Hp, Vp) of the machining position p in the camera coordinate system into the map coordinate system. In step S3, the processor 20 calculates the coordinates (Xp, Yp) of the transformed position xp, which is the transformation result in the map coordinate system, from the coordinates (Hp, Vp) of the machining position p in the camera coordinate system, by applying a predetermined arithmetic expression, for example. For example, the predetermined arithmetic expression is a transformation expression including inverse transformation of equidistant projection, and includes e.g. nonlinear transformation using a trigonometric function.

According to the coordinate data 51 obtained by the coordinate transformation as described above, a situation is conceivable that an accurate position in the map coordinate system cannot be obtained in the vicinity of the end portion of the captured image 5 having a relatively large angle θ due to the influence of lens distortion, for example. Therefore, in the present system 1, the above transformation result is corrected.

In the present embodiment, the processor 20, functioning as the coordinate correction module 43, executes arithmetic processing to correct the coordinate data 51 of the transformed position xp, based on the correction model F (x, W) (S4). For example, in response to input of the coordinate data 51 in the map coordinate system, the correction model F (x, W) generates a correction amount Δx of the vector amount. FIG. 4C illustrates a processing example of step S3.

Figure 4C:
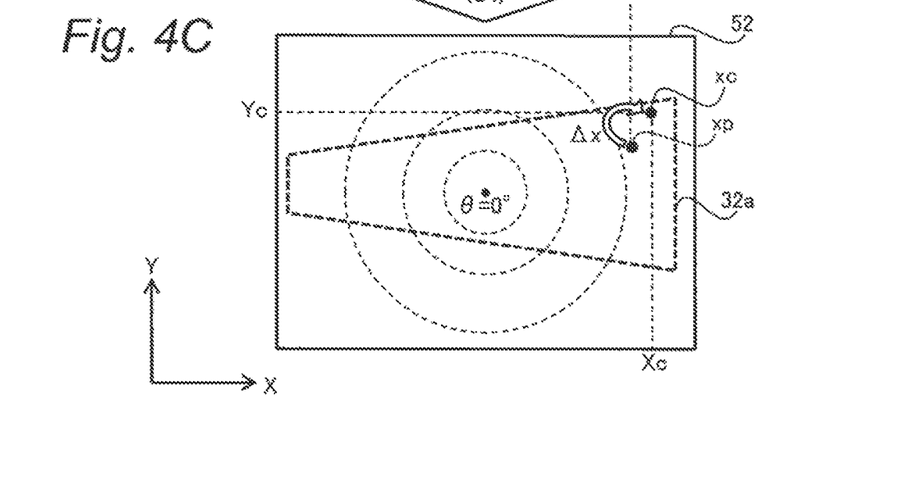

FIG. 4C illustrates coordinate data 52 indicating the processing result of step S4 based on the coordinate data 51 of FIG. 4B. FIG. 4C illustrates an accurate arrangement 32a of the workpiece 32 in the map coordinate system.

The corrected coordinate data 52 indicates coordinates (Xc, Yc) of a position xc at which the transformed position xp in the map coordinate system is corrected. The correction position xc is expressed by the following expression (1), based on the transformed position xp before correction and the correction amount Δx.

$$xc = xp + \Delta x$$

$$\Delta x = -F(x=xp, W) \quad (1)$$

In step S4, the processor 20 performs the arithmetic processing of the above expression (1) using the learned correction model F (x, W) to generate the corrected coordinate data 52. The correction model F (x, W) of the present embodiment is machine-learned so as to acquire weighting of the correction amount Δx that changes according to each distance from a plurality of positions as a calibration reference of the position analysis device 2 to the transformation position xp, for example.

For example, the processor 20 stores the corrected coordinate data 52 (S4) in the storage 21a, to end the processing shown in this flowchart.

According to the above processing, even if an error occurs in the coordinate transformation (S3) of the machining position p appearing in the captured image 5 by the omnidirectional camera 10, the correction position xc in which the error of the transformation position xp is corrected can be obtained, based on the correction model F (x, W) as illustrated in FIG. 4C (S4). In this manner, it is possible to accurately measure the target position, such as the machining position of the workpiece 32 in the workplace 3.

2-2. Correction Model

Details of the correction model F (x, W) in the position analysis device 2 of the present embodiment will be described with reference to FIGS. 5A and 5B.

The correction model F (x, W) of the present embodiment is expressed by the following expression (11), based on n reference positions a1 to an in the map coordinate system.

$$F(x, W) = \frac{\sum_{i=1}^{n} \{(X_i - a_i) \cdot f(|x - a_i|, w_i)\}}{\sum_{i=1}^{n} f(|x - a_i|, w_i)} \quad (11)$$

The denominator and numerator on the right side in the above expression (11) take a sum Σ over numbers i=1 to n for identifying the n reference positions a1 to an, respectively. FIGS. 5A and 5B illustrate a case where the number of reference positions a1 to an is n=5 (the same applies hereinafter).

In the above expression (11), the vector is indicated in bold (the same applies hereinafter). ai indicates coordinates (Xai, Yai) of an i-th reference position in the map coordinate system as a position vector. Xi indicates, as a position vector, a position corresponding to the i-th reference position ai before correction, that is, coordinates $(X_{Xi}, Y_{Xi})$ of the corresponding position in the map coordinate system. In addition, the weight parameter W can be described as an n-dimensional vector including n weight factors w1 to wn.

Figure 5A:
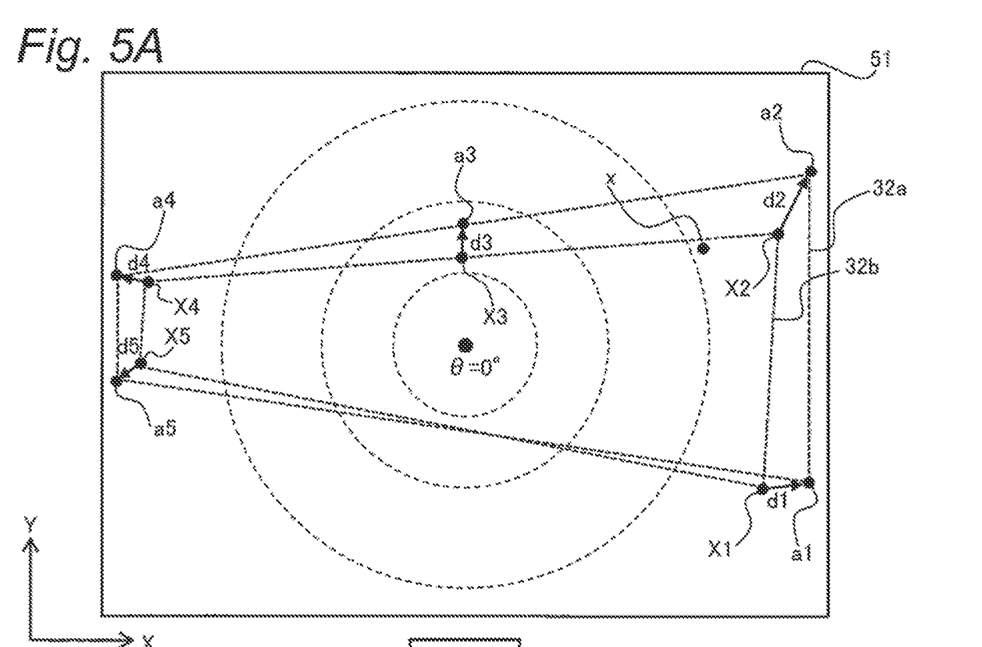
FIGS. 5A and 5B are diagrams for explaining a correction model of the position analysis device.

FIG. 5A illustrates a relation between the reference position ai and the corresponding position Xi in the correction model F (x, W). FIG. 5A illustrates the accurate arrangement 32a of the workpiece 32 in the map coordinate system, and an arrangement 32b of the workpiece 32 with coordinate transformation on the captured image of the workplace 3.

The first to n-th reference positions a1 to an are set in accordance with the accurate arrangement 32a in the map coordinate system, and are set in association with different positions in the workpiece 32, for example. For example, the i-th corresponding position Xi is at a position corresponding to the i-th reference position ai in the arrangement 32b of the workpiece 32 with the coordinate transformation by the coordinate transformation module 42 performed on the whole captured image of the workplace 3 by the omnidirectional camera 10.

In the example of FIG. 5A, each corresponding position Xi is shifted from the corresponding reference position ai by the error of the coordinate transformation by the above-described coordinate transformation module 42. Such an error is expressed by a difference vector di indicating a difference between the i-th reference position ai and the corresponding position Xi as in the following expression (12), for example.

$$di = ai - Xi \quad (12)$$

The error such as each difference vector di may be caused by lens distortion in the omnidirectional camera 10, for example. The correction model F (x, W) of the present embodiment is constructed by machine learning using the reference position ai as the ground truth of the correction position xc output when x=Xi is input.

For example, the correction model F (x, W) includes n weight functions f1 (x), f2 (x), . . . , fn (x) constituting weighting of difference vectors d1 to dn. The i-th weight function fi (x) is expressed by the following expression (13).

$$f_i(x) = \frac{f(|x - a_i|, w_i)}{\sum_{k=1}^{n} f(|x - a_i|, w_i)} \quad (13)$$

In the above expression (13), |x−ai| represents a distance from the i-th reference position ai to the position x in the map coordinate system as an absolute value of a vector. The i-th weight function fi (x) includes the i-th weight factor wi. Each of the weight factors w1 to wn is set to 0 or more and 1 or less, for example.

The i-th weight function fi (x) gives a secondary weighting that varies in accordance with the distance between the position x and each reference position ai, based on each weight factor wi. The weighting by each weight function fi (x) has a functional form that increases as the distance between the position x and each reference position ai decreases, approaching "0" as the distance increases.

Figure 5B:
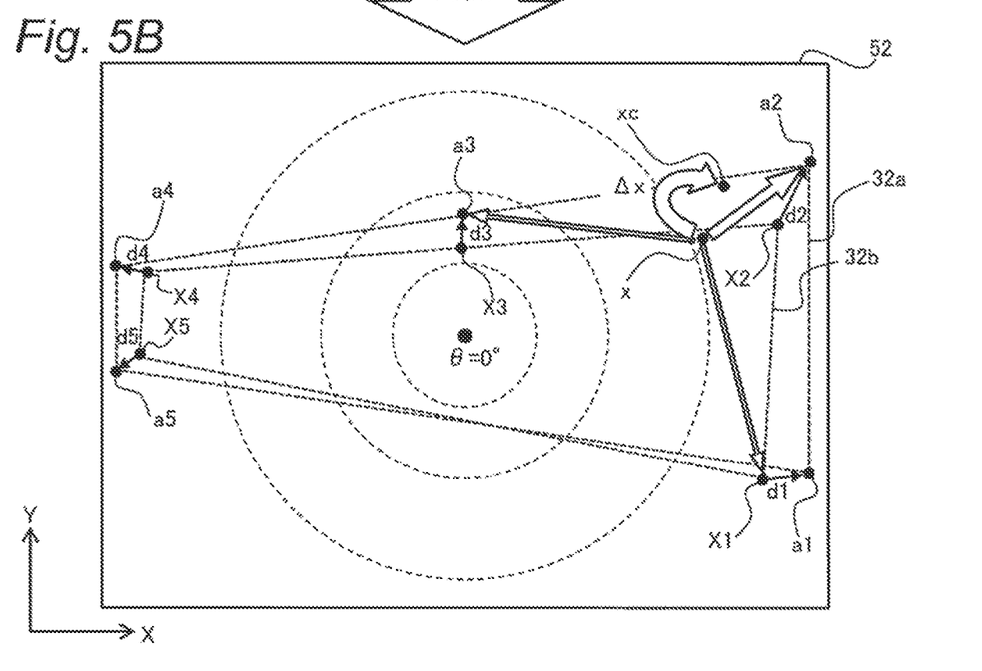

FIG. 5B illustrates a result of inputting the position x as a correction target into the correction model F (x, W) of the example of FIG. 5A. In the example of FIG. 5B, the position x before correction is located relatively closer to three reference positions a1 to a3 among the five reference positions a1 to a5. Thus, the corresponding three weight functions f1 (x) to f3 (x) give main weighting in the correction amount Δx for the position x. On the other hand, as the remaining two reference positions a4 and a5 are relatively farther from the position x, the weighting of the corresponding correction functions f4 (x) and f5 (x) is negligibly small in the correction amount Δx.

In the example of FIG. 5B, among the main three weight functions f1 (x) to f3 (x), the second weight function f2 (x) has the largest weighting. The weighting distribution in the correction amount Δx also varies in accordance with each weight factor wi, in addition to the distance to each reference position ai. In the present embodiment, machine learning of the correction model F (x, W) is performed so as to optimize such a weight factor wi. According to this, it is possible to realize the correction model F (x, W) that accurately corrects the position x of the coordinate transformation over the whole area in the map coordinate system.

The weight function fi (x) in the correction model F (x, W) as described above can be configured by adopting an exponential functional form such as the following expression (14) on the right side of the expression (13), for example.

$$f(d,w)=\exp(-w \cdot d) \quad (14)$$

In the above expression (14), as the distance d and the weight factor w, the distance |x−ai| to each reference position ai and the corresponding weight factor wi are appropriately used. The weight factor w in this case indicates a decrease rate at which f (d, w) decreases as the distance d increases. Therefore, the change for the weighting of each weight function fi (x) to decrease with the distance |x−ai| increasing can be made steeper as each weight factor wi increases.

The functional form of f (d, w) is not particularly limited to the above expression (14), and may be various monotonically decreasing functions in which the value range is 0 or more for a non-negative domain. For example, instead of the above expression (14), a functional form as in the following expression (15) can be adopted.

$$f(d,w)=w/d \quad (15)$$

in addition, f (d, w) of n weight functions f1 (x) to fn (x) is not necessarily a common functional form, and a different functional form may be used according to the reference position ai.

2-3. Calibration Operation

Figure 6A:
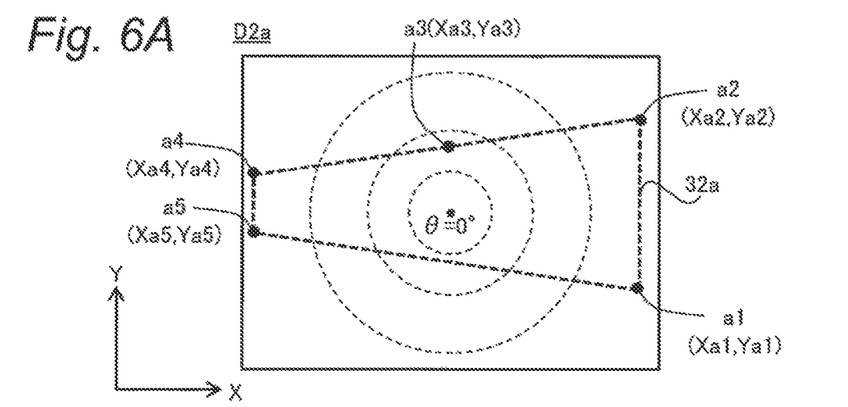
FIGS. 6A to 6C are diagrams for explaining training data in machine learning of the correction model.

An operation to calibrate the position analysis device 2 of the present embodiment by performing machine learning of the correction model F (x, W) as described above will be described with reference to FIGS. 6 and 7.

Figure 6B:
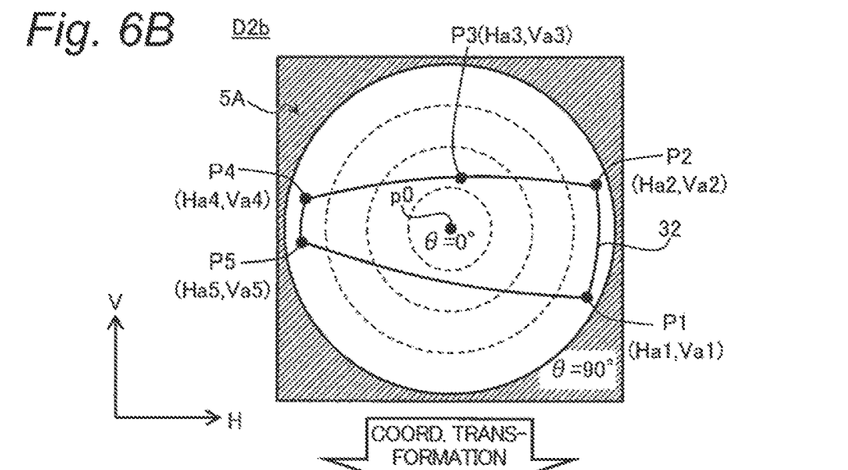
Figure 6C:
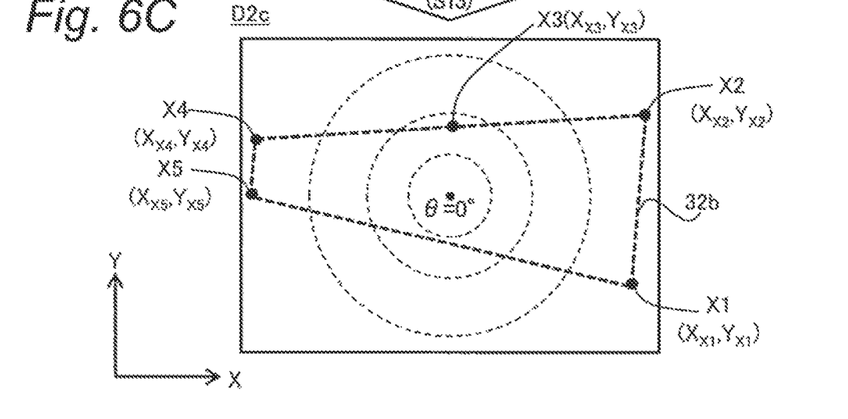

FIGS. 6A to 6C are diagrams for explaining the training data D2 in machine learning of the correction model F (x, W). FIG. 6A illustrates training data D2a in the map coordinate system. FIG. 6B illustrates training data D2b in the camera coordinate system. FIG. 6C illustrates transformed data D2c obtained from the training data D2b in the camera coordinate system.

For example, as illustrated in FIG. 6A, the training data D2a in the map coordinate system includes coordinates (Xa1, Ya1) to (Xan, Yan) of the n reference positions a1 to an in the map coordinate system. For example, the training data D2a in the map coordinate system can be created by using shape data such as three-dimensional CAD data indicating the three-dimensional shape of the workpiece 32.

For example, the training data D2a in the map coordinate system is obtained by setting, as the reference positions a1 to an n representative points, n representative points in the shape data of the workpiece 32, and calculating the coordinates of each representative point in the map coordinate system in consideration of the arrangement of the omnidirectional camera 10.

FIG. 6B illustrates training data D2b in the camera coordinate system. For example, the training data D2b in the camera coordinate system includes coordinates (Ha1, Va1) to (Han, Van) of corresponding positions P1 to Pn in the camera coordinate system corresponding to n reference positions a1 to an in a captured image 5A which is captured in advance for calibration. For example, the captured image 5A for calibration is captured by the omnidirectional camera 10 in a state where the omnidirectional camera 10, the workpiece 32, and the like are arranged in the actual workplace 3.

For example, the training data D2b in the camera coordinate system is obtained by specifying, as a corresponding position Pi in the camera coordinate system, the same place as each reference position ai in the workpiece 32 in the captured image 5A as described above. Means for specifying the corresponding position Pi in the camera coordinate system may be visual observation or image recognition processing.

Figure 7:
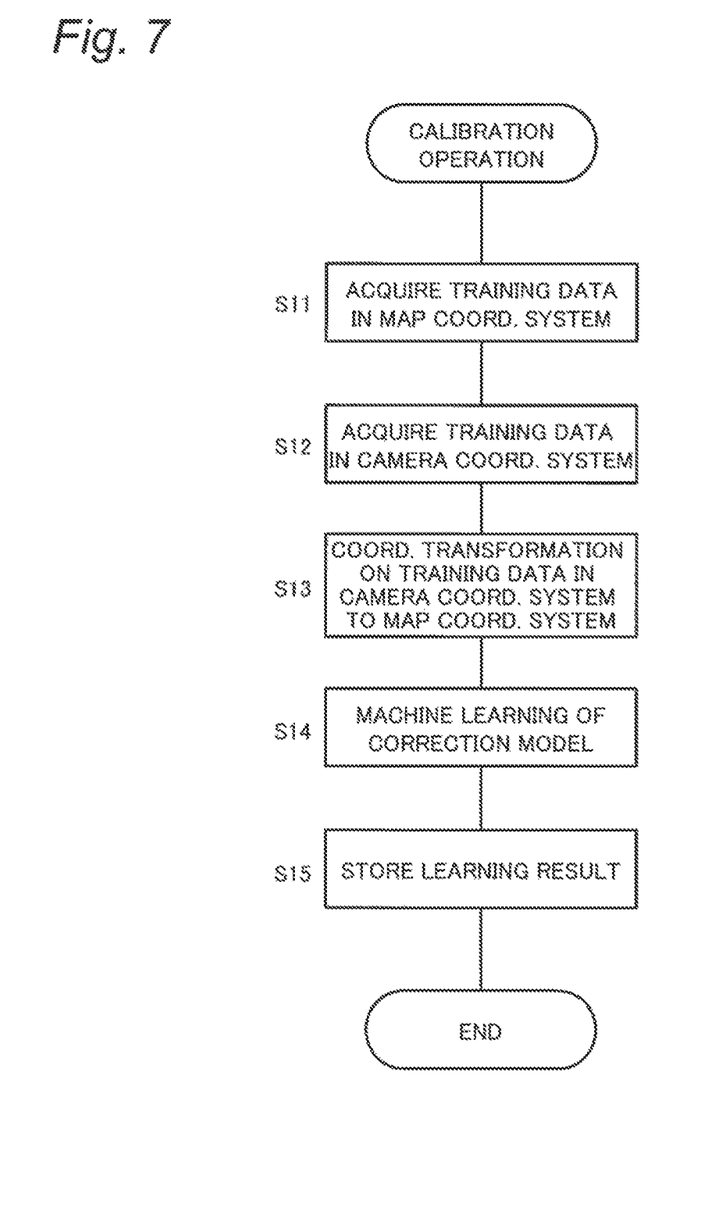
FIG. 7 is a flowchart for explaining a calibration operation of the position analysis device.

An example of an operation performed in a state where the training data D2a and D2b as described above are prepared will be described below. FIG. 7 is a flowchart for explaining a calibration operation of the position analysis device 2. The processing illustrated in this flowchart is executed by the processor 20 functioning as the model learner 44, for example.

In the flowchart illustrated in FIG. 7, the processor 20 acquires the training data D2a in the map coordinate system, which is stored in advance in the storage 21a, for example (S11). Similarly, the processor 20 acquires the training data D2b in the camera coordinate system from the storage 21a, for example (S12). Next, the processor 20 performs coordinate transformation from the camera coordinate system to the map coordinate system on the training data D2b in the camera coordinate system (S13). FIG. 6C illustrates a processing example of step S13.

FIG. 6C illustrates the transformed data D2c indicating the processing result of step S13 based on the training data D2b of FIG. 6B. The transformed data D2c includes the coordinates $(X_{Xi}, Y_{Xi})$ of each corresponding position Xi in the map coordinate system, to which coordinates (HPi, VPi) of each corresponding position Pi in the camera coordinate system is converted. In step S13, the processor 20 performs processing similar to step S3 in FIG. 3 on n corresponding positions P1 to Pn in the training data D2b in the camera coordinate system, thereby calculating n corresponding positions X1 to Xn in the map coordinate system.

Returning to FIG. 7, the processor 20 executes machine learning of the correction model F (x, W) according to the following expression (20), based on the n reference positions a1 to an and the n corresponding positions X1 to Xn in the map coordinate system (S14).

$$\min_{w_1,\ldots,w_n} \sum_{i=1}^{N} [a_i - (X_i - F(X_i, W))]^2 \quad (20)$$

According to the above expression (20), the weight factors w1 to wn of the weight parameter W are adjusted so as to minimize a square error between each reference position ai in the map coordinate system and a position to which the learning correction model F (x=Xi, W) is applied for each corresponding position Xi. The processor 20 repeats the numerical calculation of the expression (20) as appropriate until convergence is achieved.

Next, the processor 20 stores the result of the numerical calculation of the expression (20) in the memory 21 as a learning result (S15). For example, the correction model information D1 including the weight parameter W of the numerical calculation result is stored in the storage 21a. Thereafter, the processing illustrated in this flowchart ends.

According to the above processing, as calibration of the position analysis device 2, machine learning of the correction model F (x, W) can be performed using the training data D2a in the map coordinate system and the training data D2b in the camera coordinate system. This processing provides a method of generating the learned correction model F (x, W).

2-4. Modification

The calibration operation as described above may be performed multiple times in consideration of various situations in the workplace 3, for example. This modification will be described with reference to FIGS. 8A to 8C.

Figure 8A:
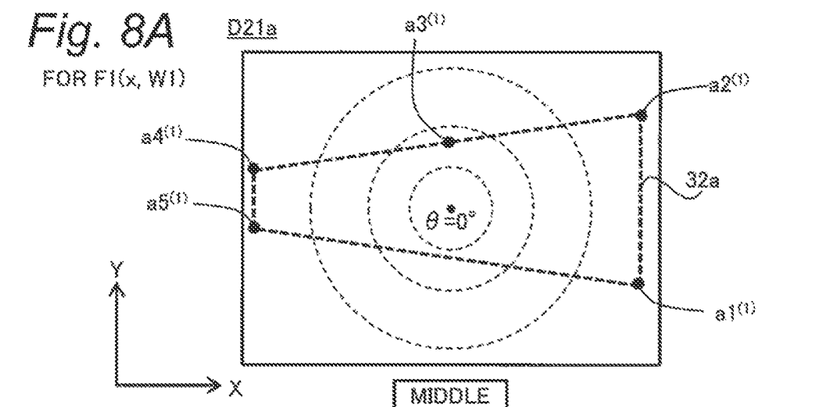
FIGS. 8A to 8C are diagrams for explaining a modification of the calibration operation of the position analysis device.
Figure 8B:
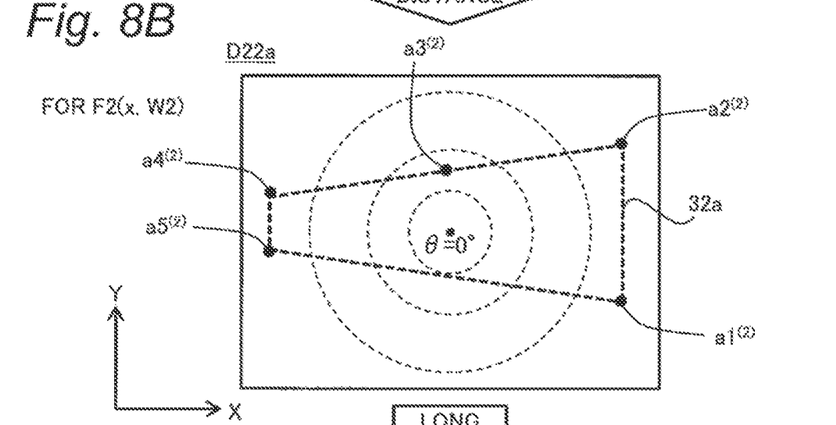
Figure 8C:
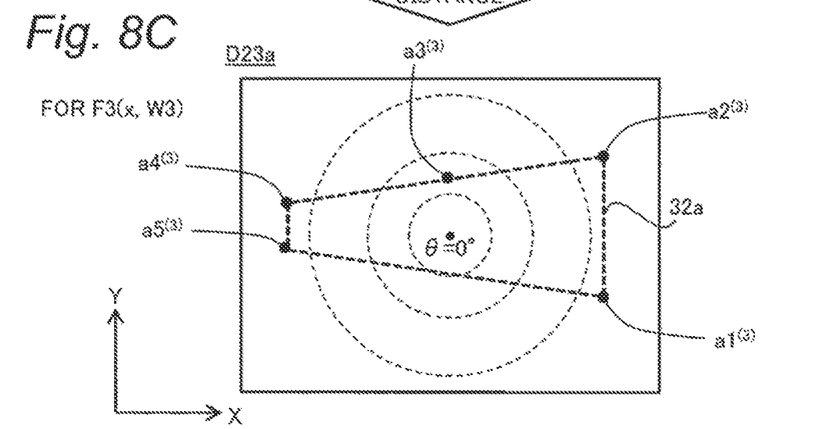

FIGS. 8A to 8C are diagrams for explaining a calibration operation of the position analysis device 2 in the present modification. For example, it is anticipated that the height of at least a part of the workpiece 32 in the workplace 3, that is, the distance to the omnidirectional camera 10 in the Z direction changes, as the work progresses. Therefore, in the present modification, the calibration operation as described above is repeatedly performed under the settings in which the height of the workpiece 32 is changed.

FIG. 8A illustrates training data D21a in the map coordinate system in a case where the workpiece 32 is at a height Z1 of an initial value. In this case, the distance to the omnidirectional camera 10 is relatively short. FIG. 8B illustrates training data D22a in the map coordinate system in the case of a middle distance with a height Z2 (<Z1). FIG. 8C illustrates training data D23a in the map coordinate system with a long distance as a height Z3 (<Z2).

Examples of FIGS. 8A, 8B, and 8C correspond to e.g. an initial stage, an intermediate stage, and an end stage of work, respectively. For example, as illustrated in FIGS. 8A to 8C, the arrangement 32a of the workpiece 32 may be different in map coordinate systems having various heights Z1, Z2, and Z3. Therefore, in the calibration operation of the present modification, the position analysis device 2 uses the training data D21a, D22a, and D23a different for each of the heights Z1, Z2, and Z3, and executes processing similar to steps S11 to S15 of FIG. 7.

According to the calibration operation described above, a first correction model F1 (x, W1) is generated in the machine learning (S14) based on the training data D21a in FIG. 8A. The first correction model F1 (x, W1) includes a plurality of weight functions f1 ($x$) to fn (x) based on the weight parameter W1 obtained by machine learning based on reference positions a1$^{(1)}$ to an$^{(1)}$ in the map coordinate system having the height Z1, similarly to the correction model F (x, W) described above.

Furthermore, second and third correction models F2 (x, W2) and F3 (x, W3) are generated in the same manner as described above based on the training data D22a and D23a in FIGS. 8B and 8C. The correction models F2 (x, W2) and F3 (x, W3) are based on reference positions a1$^{(2)}$ to an$^{(2)}$ and a1$^{(3)}$ to an$^{(3)}$ in the case of the heights Z2 and Z3, respectively, instead of the reference positions a1$^{(1)}$ to an$^{(1)}$, in the case of the height Z1. The learning results such as the weight parameters W1, W2, and W3 of the plurality of correction models F1 (x, W1) to F3 (x, W3) are stored in the memory 21 as the correction model information D1 (S15).

In the present modification, the position analysis device 2 during the basic operation appropriately detects the height of the workpiece 32, and switches, among the plurality of correction models F1 (x, W1) to F3 (x, W3), to the correction model to be applied to step S4 in FIG. 3, according to the detection result. The height may be detected by providing one or more dedicated marker at a point where the height change of the workpiece 32 is relatively larger or at some or all of the reference positions. Alternatively, the detection of the height may be estimation based on the lapse of time.

The above description is an example, and the present modification is not limited thereto. For example, the number of the plurality of correction models F1 (x, W1) to F3 (x, W3) is not limited to three, and may be two or may be four or more. The present modification can be applied to a case where the workpiece 32 is curved or deformed according to the progress of work. Also in this case, an appropriate correction model can be applied according to the progress of work, by generating a plurality of correction models based on a plurality of sets of reference positions from different training data D2 similarly to the calibration operation described above.

3. Summary

As described above, the position analysis device 2 in the present embodiment measures the target position in the workpiece 32 as an example of the subject, based on the captured image 5 of the subject by the omnidirectional camera 10. The position analysis device 2 includes, the various I/Fs 24 and 25 each as an example of an input interface, the processor 20, and the memory 21. The input interface acquires the image data 50 of the captured image 5 obtained by the omnidirectional camera 10 (S1). The processor 20 calculates coordinate transformation from the camera coordinate system, which is an example of the first coordinate system providing measure in the captured image 5, to the map coordinate system, which is an example of the second coordinate system providing measure in the subject, with respect to the machining position p, which is an example of the target position in the acquired captured image 5 (S3). The memory 21 stores the correction model F (x, W) for generating the correction amount Δx of the position in the map coordinate system. The processor 20 corrects the position xp obtained by transforming the position p as the target in the analysis from the camera coordinate system to the map coordinate system based on the correction model (S4). The correction model F (x, W) includes the plurality of weight functions f1 ($x$) to fn (x) corresponding to a plurality of different reference positions a1 to an in the map coordinate system. Each weight function fi (x) produces a larger weighting to the correction amount Δx as the transformed position xp is closer to the corresponding reference positions a1 to an.

According to the position analysis device 2 described above, the correction in which the weighting is changed according to the distance from each of the reference positions a1 to an by the correction model F (x, W) is applied to the coordinate transformation result from the camera coordinate system to the map coordinate system by the omnidirectional camera 10, and thus the correction position xc is obtained. With such a correction position xc, it is possible to accurately measure the target position in the subject from the captured image 5 by the omnidirectional camera 10.

In the present embodiment, the correction model F (x, W) sums up, for each reference position ai, a product of a difference vector di, which is an example of a vector indicating an error in coordinate transformation based on the reference position ai, and the weight function fi (x) corresponding to the reference position ai, to generate the correction amount Δx (cf. the expressions (11) and (13)). According to this, the correction position xc is obtained so as to offset the error at the reference position ai, resulting in improving the accuracy of the position measurement.

In the present embodiment, the correction model F (x, W) has the weight factor wi, which adjusts weighting according to the distance |x−ai| from each reference position ai to the transformed position x, for each weight function fi (x) (cf. the expression (13)). By the secondary weighting of the weight function fi (x) based on the weight factor wi, the correction position xc can be obtained with high accuracy.

In the present embodiment, the correction model F (x, W) is constructed by machine learning that presets the weight factor wi so as to minimize the error at each reference position ai (S14, the expression (20)). The position can be accurately corrected by the learned correction model F (x, W).

An example of the camera in the present embodiment is the omnidirectional camera 10. The camera coordinate system, which is an example of the first coordinate system, is defined by a projection method of the omnidirectional camera 10. According to the position analysis device 2 of the present embodiment, it is possible to correct an error in coordinate transformation due to lens distortion or the like of the omnidirectional camera 10.

In the present embodiment, the map coordinate system, which is an example of the second coordinate system, is defined by information indicating the arrangement of the subject such as the workpiece 32 in a place such as the workplace 3 in which the omnidirectional camera 10 is installed. According to the position analysis device 2 of the present embodiment, it is possible to accurately obtain the target position in the map coordinate system.

In the present embodiment, the target position is a position such as the machining position p at which the machining work is performed on the workpiece 32 as the subject. According to the position analysis device 2 of the present embodiment, it is possible to analyze the position at which the machining work has been performed on the workpiece 32.

In the present embodiment, the camera system 1 includes the omnidirectional camera 10 that captures an image of the subject to generate the captured image 5, and the position analysis device 2 that measures the target position in the subject based on the captured image 5 by the omnidirectional camera 10. According to the present system 1, it is possible to accurately measure the target position in the subject from the captured image 5 by the camera such as the omnidirectional camera 10.

In the present embodiment, the memory 21 stores the plurality of correction models F1 (x, W1), F2 (x, W2), and F3 (x, W3). Each of the correction models F1 (x, W1), F2 (x, W2), and F3 (x, W3) corresponds to each set of reference positions in the plurality of sets of reference positions $a1^{(1)}$ to $an^{(1)}$, $a1^{(2)}$ to $an^{(2)}$, and $a1^{(3)}$ to $an^{(3)}$. The processor 20 switches, among the plurality of correction models F1 (x, W1) to F3 (x, W3), to the correction model used to correct the target position. Appropriate correction can be performed according to the state of the subject by the plurality of correction models F1 (x, W1) to F3 (x, W3).

The position measurement method in the present embodiment is a method of measuring the target position in the subject based on the captured image of the subject by the omnidirectional camera 10. The method includes: acquiring (S1) the captured image captured by the omnidirectional camera 10; calculating (S3) coordinate transformation from the first coordinate system according to the captured image to the second coordinate system according to the subject, with respect to the target position in the acquired captured image; and correcting (S4) the transformed position from the target position in the first coordinate system to the second coordinate system, based on the correction model F (x, W) to generate the correction amount ax of the position in the second coordinate system. The correction model F (x, W) gives a larger weighting to the correction amount Δx as the transformation position xp is closer to the corresponding reference position ai in each weight function fi (x) in the plurality of weight functions f1 (x) to fn (x) corresponding to the plurality of reference positions a1 to an different from each other in the second coordinate system.

In the present embodiment, a program for causing a computer to execute the position analysis method as described above is provided. The position analysis method of the present embodiment can accurately measure the target position in the subject from the captured image 5 by the camera such as the omnidirectional camera 10.

OTHER EMBODIMENTS

As described above, the first embodiment has been described as an example of the technology disclosed in the present application. However, the technology in the present disclosure is not limited to this, and is applicable to embodiments in which changes, replacements, additions, omissions, and the like are appropriately made. Further, each component described in the above embodiments can be combined to make a new embodiment. Therefore, other embodiments are described below.

In the first embodiment described above, in step S1 of FIG. 3, an example in which the image data 50 of the captured image 5 of the omnidirectional camera 10 is acquired via the device I/F 24 has been described, but step S1 is not limited thereto. For example, the position analysis device 2 may acquire the image data 50 via the network I/F 25, or may read the image data 50 stored in advance in the memory 21. For example, the position analysis device 2 may analyze recorded image data captured in advance by the omnidirectional camera 10. Furthermore, in step S1, the image data 50 may be acquired in units of one frame or in units of a plurality of frames. The processing after step S2 can also be executed in units of a plurality of frames.

In the recognition of the machining position p in step S2 in FIG. 3, the height of the surface machining tool 34 may be considered. For example, the processor 20 as the image recognition module 41 may detect the contour line of the surface machining tool 34 together with the position of the marker 34a in the captured image 5 of the omnidirectional camera 10, and recognize the position closest to the center position p0 of the captured image 5 in the detected contour line as the machining position p. When the height to the marker 34a in the surface machining tool 34 is known, the processor 20 may calculate the machining position p by triangulation from the position of the marker 34a in the captured image 5.

In the above description, an example in which the height of the surface machining tool 34 is reflected in the processing of step S2 has been described, but the height may be reflected at the time of calibration. For example, when the captured image 5A for calibration is captured, a jig having a marker having the same height as the height of the marker 34a of the surface machining tool 34 is arranged at each reference position. By performing the calibration operation similar to that in FIG. 7 using the training data D2b based on the captured image 5A, it is possible to obtain the weighting of the correction model F (x, W) in which the height of the marker is considered in advance. In this case, in step S2 during the basic operation, even if the position of the marker 34a is recognized as the machining position p, the correction position xc can be obtained with high accuracy.

In the above embodiments, the machining position at which the surface machining is performed has been described as an example of the target position in the position analysis device 2. In the present embodiment, the target position is not limited thereto, and can be set to various positions to be analyzed by the user 11, for example. For example, the target position may be a position of a place where machining work different from surface machining is performed on the workpiece 32, or may be a position of the worker 31 in the workplace 3 as an example of the subject. The workplace 3 and various objects constituting the workplace 3 are an example of a subject in the present embodiment. Further, the target position is not limited to one point, and may be a plurality of points, lines, or regions.

In the above embodiments, an example in which the reference positions a1 to an are set in the workpiece 32 has been described, but the reference positions are not limited thereto. In the present embodiment, the reference position may be set in the pedestal 33 of the workpiece 32, for example. For example, the training data D21a in the map coordinate system may be created using shape data such as three-dimensional CAD data of the pedestal 33.

In the above embodiments, the omnidirectional camera 10 has been described as an example of the camera in the camera system 1. In the present embodiment, the camera system 1 is not limited to the omnidirectional camera 10, and may include various cameras. For example, the camera of the present system 1 may be various imaging devices that employ various projection methods such as an equisolid angle projection method, a stereoscopic projection method, an orthogonal projection method, a cylindrical projection method, and a central projection method.

Furthermore, in the above embodiments, an example in which the camera system 1 is applied to the workplace 3 has been described. In the present embodiment, the site to which the camera system 1 and the position analysis device 2 are applied is not particularly limited to the workplace 3, and may be various sites such as a shop floor.

As described above, the embodiments have been described as an example of the technology in the present disclosure. For this purpose, the accompanying drawings and the detailed description have been provided.

Accordingly, some of the components described in the accompanying drawings and the detailed description may include not only essential components for solving the problem but also components which are not essential for solving the problem in order to describe the above technology. Therefore, it should not be immediately recognized that these non-essential components are essential based on the fact that these non-essential components are described in the accompanying drawings and the detailed description.

The present disclosure is applicable to an application of measuring various target positions in various subjects using a camera.

The invention claimed is:

1. A position analysis device for measuring a target position in a subject based on a captured image of the subject by a camera, the position analysis device comprising:
   an input interface that acquires the captured image obtained by the camera;
   a processor that calculates coordinate transformation from a first coordinate system to a second coordinate system with respect to the target position in the acquired captured image, the first coordinate system providing measure in the captured image, the second coordinate system providing measure in the subject; and
   a memory that stores a correction model to generate a correction amount of a position in the second coordinate system, wherein
   the processor corrects a transformed position from the target position, based on the correction model including a plurality of weight functions corresponding to a plurality of reference positions, the transformed position being a position obtained by the coordinate transformation on the target position in the first coordinate system to the second coordinate system, the weight functions each producing a larger weighting in the correction amount as the transformed position is closer to a corresponding reference position, the reference positions being different from each other in the second coordinate system.

2. The position analysis device according to claim 1, wherein the correction model generates the correction amount by summing up, for each reference position, a product of a vector and a weight function corresponding to the reference position, the vector indicating an error of the coordinate transformation with respect to the reference position.

3. The position analysis device according to claim 1, wherein the correction model has a weight factor for each weight function, the weight factor adjusting the weighting in accordance with a distance from each reference position to the transformed position.

4. The position analysis device according to claim 3, wherein the correction model is constructed by machine learning for presetting the weight factor to minimize an error at each reference position.

5. The position analysis device according to claim 1, wherein
   the memory stores a plurality of correction models each corresponding to each set of reference positions in a plurality of sets of reference positions, and
   the processor switches, among the plurality of correction models, a correction model to be used for correction of the target position.

6. The position analysis device according to claim 1, wherein
   the camera is an omnidirectional camera, and
   the first coordinate system is defined by a projection method of the omnidirectional camera.

7. The position analysis device according to claim 1, wherein the second coordinate system is defined by information on arrangement of the subject at a place where the camera is installed.

8. The position analysis device according to claim 1, wherein the target position is a position at which a machining work is performed on a workpiece as the subject.

9. A camera system comprising:
   a camera that captures an image of the subject to generate the captured image; and the position analysis device according to claim 1, which measures the target position in the subject, based on the captured image by the camera.

10. A position analysis method for measuring a target position in a subject based on a captured image of the subject by a camera, the position analysis method comprising:
acquiring the captured image obtained by the camera;
calculating coordinate transformation from a first coordinate system to a second coordinate system with respect to the target position in the acquired captured image, the first coordinate system providing measure in the captured image, and the second coordinate system providing measure in the subject; and
correcting a transformed position from the target position, based on a correction model to generate a correction amount of a position in the second coordinate system, the transformed position being a position obtained by the coordinate transformation on the target position in the first coordinate system to the second coordinate system, wherein the correction model provides a larger weighting in the correction amount for each weight function in a plurality of weight functions corresponding to a plurality of reference positions as the transformed position is closer to a corresponding reference position, the reference positions being different from each other in the second coordinate system.

11. A non-transitory computer-readable recording medium storing a program that causes a computer to execute the position analysis method according to claim 10.

\* \* \* \* \*